United States Patent [19]

Byerley

[11] 4,267,062

[45] May 12, 1981

[54] ABANDONED BOREHOLE COMPOSITIONS

[75] Inventor: Thomas L. Byerley, Fountain Valley, Calif.

[73] Assignee: NL Industries, Inc., New York, N.Y.

[21] Appl. No.: 42,885

[22] Filed: May 29, 1979

Related U.S. Application Data

[63] Continuation of Ser. No. 844,279, Oct. 21, 1977, abandoned.

[51] Int. Cl.³ .............................................. E21B 33/00
[52] U.S. Cl. ............................ 252/8.55 R; 166/305 R
[58] Field of Search ............. 252/8.5 R, 8.5 A, 8.5 C, 252/8.55 R; 166/305 R

[56] References Cited

U.S. PATENT DOCUMENTS

| | | | |
|---|---|---|---|
| 2,425,768 | 8/1947 | Wagner | 252/8.5 |
| 2,776,259 | 1/1957 | Salathiel | 252/8.5 |
| 3,081,260 | 3/1963 | Park | 252/8.5 |
| 3,380,522 | 4/1968 | Payne et al. | 166/292 X |

FOREIGN PATENT DOCUMENTS

| | | | |
|---|---|---|---|
| 140931 | 1/1949 | Australia | 252/8.5 |
| 1041892 | 10/1958 | Fed. Rep. of Germany | 252/8.5 |

*Primary Examiner*—Herbert B. Guynn

[57] ABSTRACT

Compositions for boreholes which are to become abandoned and to a process for using the same wherein the compositions contain a mixture of about 89.5% to about 99.4% by weight clay gellant, about 0.5% to about 10% by weight water-soluble alkali metal salt, and about 0.1% to about 3.0% by weight salt of carboxymethylcellulose.

3 Claims, No Drawings

ABANDONED BOREHOLE COMPOSITIONS

This is a continuation of application Ser. No. 844,279, filed Oct. 21, 1977, now abandoned.

This invention relates to compositions for boreholes which are to become abandoned and to a process for using the same.

When relatively shallow wells are drilled with rotary drilling equipment such as in water and gas exploration, mineral exploration, and seismic hole testing, a drilling fluid is generally circulated down the drill pipe to the bit and back up the hole to the surface. The drilling fluid performs many functions which are vital to the success of the drilling process. Generally, the best drilling fluids are aqueous suspensions of suspended solids, such as clay which readily form colloidal dispersions that are stable and low in viscosity.

Upon completion of the drilling process and of the desired exploration or testing procedures, the boreholes have generally been abandoned without any additional treatment to seal the hole. Abandoned boreholes containing the aforementioned drilling fluids, however, have not maintained a stabilized condition. For example, loss of mud to the surrounding formation in exploratory boreholes in New Mexico, U.S.A. have been repeatedly observed with corresponding decreases in filtration control and fluid gel strength.

Environmental regulations have been recently adopted which attempt to prevent continuation of these practices. One such regulation has been passed in New Mexico which regulation requires an abandoned borehole to contain a mud system that will maintain a high viscosity while decreasing fluid loss from the borehole over extended periods of time in order to obtain the necessary filtration control and gel strength to suspend solids and control formation pressures.

The present invention provides a composition for use in boreholes being abandoned, which composition when used in an aqueous fluid, such as water or an aqueous drilling mud system increases the viscosity of the fluid while it decreases fluid loss after placement throughout the total depth of the borehole.

The borehole additive compositions of this invention comprise a mixture of about 89.5% to about 99.4% by weight clay gellant, about 0.5% to about 10% by weight water-soluble alkali metal salt, and about 0.1% to about 3.0% by weight salt of carboxymethylcellulose.

The borehole additive compositions of this invention are used by adding a sufficient amount of the composition with mixing to an aqueous fluid until the fluids funnel viscosity is raised by at least 10 seconds/quart, and preferably 20 seconds/quart, and passing the treated fluid into the borehole.

The compositions are used in sufficient amounts to prepare a colloidal suspension with low unit weight and with suitable viscosity, good gel properties and low filtrate loss. These desirable properties are achieved when the compositions are added to fresh water to prepare a viscous suspension or when added to increase the viscosity of an aqueous mud system already in use in amounts to increase the API funnel viscosity by at least 10 seconds/quart and preferably by at least 20 seconds/quart. It has been found that the necessary API funnel viscosity can be achieved by employing about 1 lb/bbl to 30 lb/bbl (42 gallon barrel) of the composition in the aqueous system. The exact amount added, however, may vary depending on water hardness and existing mud system properties. Besides increasing funnel viscosity, the resulting aqueous systems will have a minimum ten minute gel strength of 20 lb/100 sq. ft. and a maximum API filtrate of 15.0 cc/30 min, and preferably 10.0 cc/30 min.

The clays used to prepare the compositions of this invention are smectite-type clays which have a cation exchange capacity of at least 75 milliequivalents per 100 grams of clay. Particularly desirable types of clay are the naturally-occurring Wyoming varieties of swelling bentonites and like clays, and hectorite, a swelling magnesium-lithium silicate clay.

The clays, especially the bentonite type clays, are preferably converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound such as sodium carbonate, sodium hydroxide and the like and shearing the mixture with a pugmill or extruder.

Smectite-type clays prepared synthetically by either a pneumatolytic or, preferably a hydrothermal synthesis process can also be used. Representative of such clays are montmorillonite, bentonite, beidellite, hectorite, saponite and stevensite. These clays may be synthesized hydrothermally by forming an aqueous reaction mixture in the form of a slurry containing mixed hydrous oxides or hydroxides of the desired metals with or without sodium flouride or alternate exchangeable cation of mixture thereof in the proportions for the particular synthetic smectite desired. The slurry is then placed in an autoclave and heated under autogenous pressure to a temperature within the range of approximately 100° to 325° C., preferably 274° to 300° C., for a sufficient period of time to form the desired product. Representative hydrothermal processes for preparing synthetic smectites are described in the following United States patents, incorporated herein by reference; U.S. Pat. Nos. 3,252,757 to Granquist; 3,586,478 to Neumann; 3,666,407 to Orlemann; 3,671,190 to Neumann; 3,844,978 and 3,844,979 to Hickson; and 3,852,405 and 3,855,147 to Granquist.

The clay gellants are employed in amounts of about 89.5 to about 99.4% by weight and preferably about 92.0 to about 97.5% by weight of the composition. These amounts of clay gellant are necessary to achieve the requisite gel strengths and funnel viscosities.

The water-soluble alkali metal salts used in the compositions of this invention may be selected from a wide range of materials, both inorganic and organic, which are reactive with calcium and magnesium salts and other hardness causing salts to form insoluble compounds. Calcium salts, such as anhydrite or gypsum, seriously impair the suspending and sealing properties of the clay gellant.

The water-soluble alkali metal salts are employed in amounts of about 0.5 to about 10% by weight, and preferably about 2 to about 6% by weight of the composition. It has been found that these amounts are sufficient to remove the cations normally present in the solution. Amounts less than 0.5% are not effective in curbing the adverse effects of the hardness cations. Amounts greater than 10% should not be employed since these high amounts may begin to flocculate the clay gellant with resulting loss in filtration control. The water-soluble alkali metal salts useful in the invention are described in U.S. Pat. No. 2,433,668 and are preferably selected from sodium carbonate, potassium carbonate, sodium bicarbonate, potassium bicarbonate, sodium citrate, potassium citrate, sodium oxalate, potassium oxalate, sodium stearate and potassium stearate.

The salts of carboxymethylcellulose used in the composition of this invention are preferably selected from potassium and sodium. These materials should be (a) readily soluble in water or alkali solutions; (b) neutral or alkaline in solution; (c) non-hygroscopic or essentially non-hygroscopic (d) low in transition metal content, and (e) have a preferred degree of substitution from 0.5 to 1.5 and most preferably from 0.6 to 0.8.

The carboxymethylcellulose is added in sufficient amounts to decrease the fluid filtration rate and cake thickness, yet promote hole stability in water-sensitive formations. These properties have been achieved when amounts of about 0.1 to about 3.0% by weight, preferably about 0.5 to about 2.0% by weight material is employed in the composition. Amounts less than 0.1% do not provide sufficient yield point and gel strengths. Amounts higher than 3.0%, while maintaining filtration control are not able to maintain a controlled flocculation of the clay gellant.

The compositions of this invention are prepared by conventional dry mixing procedures. The method of addition is not critical. It is advisable, however, to obtain a homogenous mixture of the ingredients prior to their dispersal in the aqueous fluid. The aqueous fluid may be water, or an aqueous mud system, such as a drilling fluid already in use.

Dispersion is easily accomplished by carrying out mixing in a fluid mud mixer, hopper or other conventional device. The composition may optionally be dispersed in water prior to mixing with an aqueous mud system. Once dispersed, the compositions are circulated throughout the total depth of the borehole. Once circulation is complete, the fluid is allowed to remain in the borehole without additional treatment and the borehole abandoned, providing the necessary increase in funnel viscosity has been achieved. The ability to obtain and maintain fluid viscosities with low filtrate loss in fluids used in abandoned boreholes has heretofore not been achieved to the level obtained by use of the inventive compositions.

The following examples are given to illustrate the invention but are not deemed to be limiting thereof. All percentages given are based upon weight unless otherwise indicated. All measurements were performed in accordance with the *American Petroleum Institutes Standard Procedure for Testing Drilling Fluids* identified as API RP13B, 6th Ed., April, 1976.

EXAMPLE 1

Runs 1 to 7

An additive for a borehole being abandoned was prepared by mixing 95% Wyoming bentonite, 4% sodium carbonate and 1% sodium carboxymethylcellulose, all percentages are by weight. This composition was used to treat various drilling fluids used in drilling mineral exploratory boreholes. The results are set forth in Table 1. The drilling fluids and water in Runs 1 to 4 were from the Churchrock area of New Mexico. The drilling fluids and water in Runs 5 and 6 were from the Ambrosia Lake area of New Mexico, whereas the drilling fluid in Run 7 was from the Nose Creek area of New Mexico.

The data indicates that fluids prepared with the inventive compositions will have commercially effective minimum ten minute gel strengths and maximum API filtrates for use as borehole abandonment fluids. The blanks in the table represent those values which were not measured.

TABLE 1

| Sample No. | Churchrock Area | | | | Ambrosia Lake Area | | Nose Creek Area |
|---|---|---|---|---|---|---|---|
| | 1 | 2 | 3 | 4 | 5 | 6 | 7 |
| Initial Data | | | | | | | |
| Weight (ppg) | 10.2 | 10.1 | 10.4 | 8.33 | 9.4 | 8.33 | 9.5 |
| Funnel Viscosity (sec/qt) | 38 | 38 | 44 | 26 | 30 | 26 | 31.5 |
| Plastic Viscosity (cp) | 15 | 13 | 20 | 0 | 6 | 0 | 6 |
| Yield Point (lb/100 sq ft) | 15 | 4 | 5 | 0 | 2 | 0 | 1 |
| Gel Strength (lb/100 sq ft)- 10 sec/10 min | 7/17 | 7/15 | 7/15 | 0/0 | 2/5 | 0/0 | 0/0 |
| Filtrate, API (ml/30 min) | 15.2 | 13.0 | 10.4 | — | 42.0 | — | 4 |
| Total Hardness (ppm) | 32 | 48 | 32 | — | 248 | 400 | 48 |
| Sand Content (% by Vol.) | 5 | 5 | 5 | — | 2 | — | .2 |
| Solids Content (% by Vol.) | 13.5 | 12.2 | 15 | — | 7.7 | — | — |
| Water Content (% by Vol.) | 86.5 | 87.8 | 85 | 100 | 92.3 | 100 | — |
| Additive | | | | | | | |
| lb/bbl. | 3.2 | 4.0 | 3.0 | 20.0 | 7.6* | 20.0 | 12 |
| Final Data | | | | | | | |
| Funnel Viscosity (sec/qt) | 48 | 48 | 60 | 38 | 80 | 39 | 59 |
| Plastic Viscosity (cp) | 17 | 18 | 23 | 6 | 22 | 9 | 23 |
| Yield Point (lb/100 sq ft) | 14 | 14 | 17 | 10 | 21 | 12 | 11 |
| Gel Strength (lb/100 sq ft)- 10 sec/10 min | 10/23 | 12/24 | 10/26 | 8/25 | 17/38 | 12/24 | 11/23 |
| Filtrate, API (ml/30 min) | 10.4 | 7.8 | 6.4 | 10.4 | 8.8 | 11.2 | 8.4 |
| Total Hardness (ppm) | 28 | 40 | 32 | — | 140 | — | 60 |

*This additive contained 93.75% Wyoming bentonite, 4.61% sodium carbonate and 1.64% CMC.

EXAMPLE 2

Runs 8 to 11

Compositions were prepared containing various concentrations of Wyoming bentonite, sodium carbonate and sodium carboxymethylcellulose. The samples were added in amounts of 20 lb/bbl (42 gallon barrel) to deionized water which had been saturated with gypsum and mixed for 20 minutes. The results are set forth in Table II.

The invention being thus described, it will be obvious that the same may be varied in many ways. Such variations are not to be regarded as a departure from the spirit and scope of the invention, and all such modifications are intended to be included within the scope of the following claims.

TABLE II

| | Run 8 | Run 9 | Run 10 | Run 11 |
|---|---|---|---|---|
| Additive composition | | | | |
| Wyoming Bentonite | 95 | 96 | 97 | 98 |
| Sodium Carbonate | 4 | 3 | 2 | 1 |
| CMC | 1 | 1 | 1 | 1 |
| Treated Fluid | | | | |
| Plastic Viscosity, (cp) | 9 | 8 | 5.5 | 3 |
| Yield Point (lb./100 sq ft) | 16 | 13 | 10 | 6 |
| Gel Strength (lb./100 sq ft) 10 sec/10 min | 20/50 | 17/44 | 10/32 | 5/12 |
| Filtrate, API (ml/30 min.) | 8.6 | 8.5 | 9.4 | 12.5 |

What is claimed is:

1. A process for suspending solids and controlling formation pressures within a borehole to be abandoned which comprises:

(a) preparing a composition essentially comprising about 89.5 to about 99.4% by weight water swellable clay gellant selected from the group consisting of natural and synthetic, sodium form montmorillonite, bentonite, beidellite, hectorite, saponite, stevensite, and mixtures thereof, about 0.5% to about 10% by weight water-soluble alkali metal salt selected from the group consisting of sodium and potassium carbonates, bicarbonates, citrates, oxalates, stearates, and mixtures thereof and about 0.1 to about 3.0% by weight of a water soluble, essentially non-hygroscopic salt of carboxymethylcellulose, having a degree of substitution in the range of about 0.5 to 1.5, selected from the group consisting of sodium carboxymethylcellulose, potassium carboxymethylcellulose and mixtures thereof;

(b) Mixing said composition of step (a) with fresh water to form an aqueous slurry having a gel strength of at least 20 lb/100 ft$^2$ and having an API filtration rate less than about 15 cc/30 minutes;

(c) Circulating said aqueous slurry throughout the total depth of said borehole and allowing said aqueous slurry to remain in the borehole.

2. The process of claim 1 wherein said composition comprises about 92 to about 97.5 by weight sodium bentonite, about 2 to about 6% by weight of said water soluble alkali metal salt, and about 0.5 to 2% by weight of said salt of carboxymethylcellulose, and wherein said composition comprises about 1 to about 30 lb/bbl of said aqueous slurry.

3. The process of claim 1 wherein the aqueous slurry API funnel viscosity is raised by at least 20 seconds/quart.

* * * * *